United States Patent [19]

Hudspeth et al.

[11] Patent Number: 4,968,957
[45] Date of Patent: Nov. 6, 1990

[54] TRANSMIT AND RECEIVE DIPLEXER FOR CIRCULAR POLARIZATION

[75] Inventors: Thomas Hudspeth, Malibu; Fritz Steinberg, Culver City, both of Calif.

[73] Assignee: Hughes Aircraft Company, Los Angeles, Calif.

[21] Appl. No.: 359,242

[22] Filed: May 31, 1989

[51] Int. Cl.$^5$ .............................................. H01P 5/12
[52] U.S. Cl. .................................... 333/126; 333/135; 333/209
[58] Field of Search .............................. 333/208–212, 333/126, 129, 132, 135, 137

[56] References Cited

U.S. PATENT DOCUMENTS

| | | | |
|---|---|---|---|
| 2,965,752 | 12/1960 | Medford et al. | 333/126 X |
| 3,428,918 | 2/1969 | Matthaei | 333/135 |
| 3,617,956 | 11/1971 | Bastikar | 333/212 |
| 3,668,564 | 6/1972 | Ren et al. | 333/135 |
| 3,731,235 | 5/1973 | Ditullio et al. | 333/135 |
| 3,845,423 | 10/1974 | Scherner | 333/129 X |
| 4,173,744 | 11/1979 | Faillon et al. | 333/33 |
| 4,427,953 | 1/1984 | Hudspeth et al. | 333/134 |
| 4,689,627 | 8/1987 | Lee et al. | 342/373 |
| 4,717,897 | 1/1988 | Gehin et al. | 333/125 |
| 4,783,639 | 11/1988 | Hudspeth et al. | 333/135 X |

FOREIGN PATENT DOCUMENTS

| | | | |
|---|---|---|---|
| 0139501 | 8/1983 | Japan | 333/212 |
| 2006539 | 5/1979 | United Kingdom | 333/210 |

*Primary Examiner*—Eugene R. LaRoche
*Assistant Examiner*—Seung Ham
*Attorney, Agent, or Firm*—Robert A. Westerlund; Steven M. Mitchell; Wanda K. Denson-Low

[57] ABSTRACT

A diplexer for processing polarized energy at separate transmit and receive frequencies. The nature of the polarization may be circular, linear or elliptical depending upon the phasing associated therewith. The diplexer comprises a waveguide having first and second ports disposed at opposite ends thereof. A symmetrical bandpass resonator arrangement is disposed around the periphery of the waveguide and couples energy at the receive frequency out of the waveguide. A symmetrical bandstop resonator arrangement is also disposed around the periphery of the waveguide and filters energy at the receive frequency to prevent coupling of received energy to the second port. The bandpass resonators of each of the resonator arrangements generally include tuning members that control the amount of energy coupled from the waveguide and that adjust and balance the polarization components of the energy to maintain the polarization state thereof. A plurality of tuning rings may be diposed adjacent to the first port that compensate for the impedance mismatch caused by external components coupled to the waveguide. A tuning ring may also be provided at the second port that compensates for impedance mismatch caused by the resonator arrangements. The diplexer is generally an overmoded structure that permits the propagation of higher order modes in the received energy. The symmetry provided in the bandpass resonator arrangement inhibits or prevents the excitation of these higher order modes and hence received energy not coupled out of the diplexer through the second port. Similarly, the symmetrical nature of the bandstop resonator arrangement also inhibits scattering of higher order modes and hence improves the performance of the diplexer.

8 Claims, 3 Drawing Sheets

TRANSMIT AND RECEIVE DIPLEXER FOR CIRCULAR POLARIZATION

BACKGROUND

The present invention relates generally to diplexers, and more particularly to a microwave diplexer that simultaneously processes polarized energy at different transmit and receive frequencies.

It is desirable to design antenna systems for use in spacecraft applications in a manner that limits the size and weight thereof. To accomplish this, it is very desirable to design such systems so that a single set of antenna feed horns may be used in instances where energy is transmitted at one frequency and received on another. This technique is known as diplexing, and is commonly done in the art. However, if circularly polarized energy is employed in the system, for example, conventional diplexing approaches tend to become larger and heavier than are generally acceptable. Consequently, it would be an improvement in the art to have a diplexer that permits the simultaneously processing of polarized energy at different transmit and receive frequencies while maintaining the polarization characteristics of the energy and which provides for the use of a single antenna feedhorn at both transmit and receive frequencies.

SUMMARY OF THE INVENTION

In order to provide the above-cited improvements, the present invention comprises a diplexer that is capable of processing polarized energy at separate transmit and receive frequencies. The nature of the polarization may be circular, linear or elliptical. The diplexer comprises a waveguide having first and second ports disposed at opposite ends thereof. A plurality of symmetrical bandpass resonator arrangements are disposed around the periphery of the waveguide and each typically protrudes a predetermined length into the waveguide. The bandpass resonator arrangements act as a filter that couples energy at the receive frequency out of the waveguide. A plurality of symmetrical bandstop resonator arrangements are also disposed around the periphery of the waveguide. The bandstop resonator arrangements also generally protrude a predetermined length into the waveguide. The bandstop resonator arrangements filter energy at the receive frequency to prevent coupling of received energy to the second port, and is transparent to energy transmitted at the transmitting frequency.

Coaxial transmission lines are coupled to each bandpass resonator arrangement. The bandpass resonators of each of the resonator arrangements generally include tuning members that control the amount of energy coupled from the waveguide through the transmission lines, and that adjust and balance the polarization components of the energy to maintain the polarization state thereof. Typically one tuning member is provided to adjust the capacitance of the bandpass resonator arrangement, while another tuning member is provided to adjust the inductance thereof in order to tune the resonant frequency of the bandpass resonator arrangement. A plurality of slidable dielectric members are provided to vary the capacitive coupling between the two resonators and between the second resonator and the coaxial transmission line. These members determine and control the output coupling from the diplexer.

A plurality of tuning rings may be disposed adjacent to the first port that compensate for the impedance mismatch caused by external components coupled to the waveguide. Typically this mismatch is caused by the antenna feedhorn/diplexer interface. A tuning ring may also be provided at the second port that compensates for impedance mismatch caused by the protrusion of the resonators into the interior of the waveguide.

The diplexer is generally an overmoded structure that permits the propagation of higher order modes at the received frequency. The symmetry provided in the bandpass resonator arrangement inhibits or prevent the excitation of these higher order modes and hence these modes are not coupled out of the diplexer. Similarly, the symmetrical nature of the bandstop resonator arrangement also inhibits scattering of higher order modes and hence improves the performance of the diplexer.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
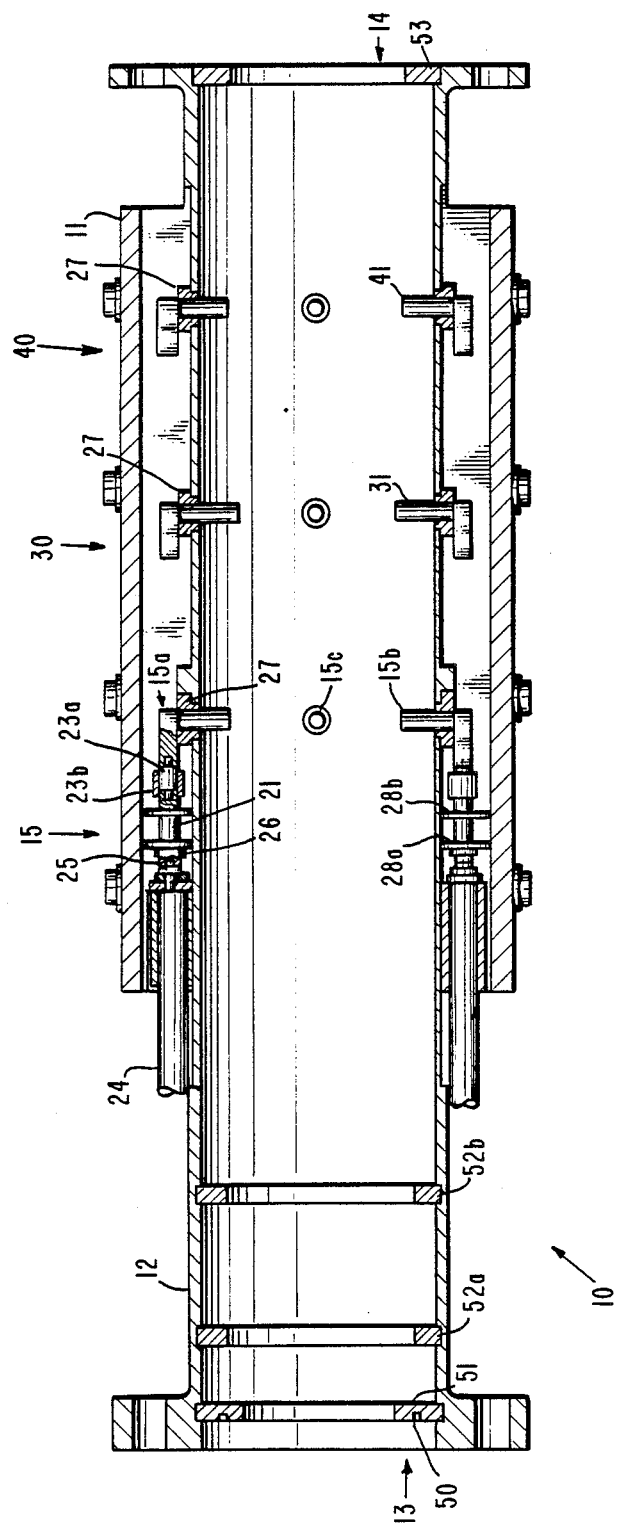
FIG. 1 is a cutaway side view of a diplexer in accordance with the principles of the present invention.

Referring to FIG. 1, a cutaway side view of a diplexer 10 in accordance with the principles of the present invention is shown. The diplexer 10 includes an outer body 11 having a waveguide 12 extending therethrough. The body 11 and the waveguide 12 may have any desired cross section, and in the disclosed embodiment have a circular cross section. Optimum configurations for circular polarized energy include those with quadrantal symmetry including circular, square, octagonal, or the like. First and second waveguide ports 13, 14 are provided at opposite ends of the waveguide 12. A plurality of bandpass resonator arrangements 15, comprising a first pair of opposed resonator arrangements 15a, 15b and a second pair of opposed resonator arrangements 15c, 15d (not shown), are symmetrically disposed around the periphery of the waveguide 12 and inside the body 11.

Each of the bandpass resonator arrangement 15 comprises a metal L-shaped resonator 20 that has one arm of the L protruding through the wall of the waveguide 12 and into the interior thereof a predetermined distance. The other arm of the L extends longitudinally along the waveguide 12 and is coupled to a second resonator 21 by a dielectric spacer 23a having a dielectric tuning collar 23b slidably affixed therearound. The second resonator 21 is coupled to a coaxial transmission line 24 by way of a dielectric spacer 25 having a second slidable dielectric collar 26 disposed therearound. The L-shaped resonator 20 is secured in the sidewall of the waveguide 12 by means of a dielectric bushing 27 and the balance of the resonator arrangement 15 is secured between the outer wall of the waveguide 12 and the inner wall of the body 11 by means of two annular dielectric rings 28a, 28b that grip the second resonator 21.

Two bandstop resonator arrangements 30, 40 are also disposed around the periphery of the waveguide 12, generally in the vicinity of the second waveguide port 14 and generally longitudinally aligned with respective ones of the bandpass resonator arrangements 15. The bandstop resonator arrangements 30, 40 are adapted to filter received energy so that received power is not transmitted through the second port 14, which port is generally coupled to a transmitter. The bandstop resonator arrangements 30, 40 are comprised of symmetrically disposed L-shaped resonators 31, 41 which protrude into the interior of the waveguide 12 a predetermined distance.

A plurality of tuning rings 50, 51, 52a, 52b are disposed adjacent to the first port 13 to compensate for the impedance mismatch caused by external components coupled to the waveguide 12. Typically this mismatch is caused by the antenna feedhorn/diplexer interface. A tuning ring 53 is also provided at the second port 14 that compensates for impedance mismatch caused by the protrusion of the resonator arrangements 15, 30, 40 into the interior of the waveguide 12. These tuning rings 50, 51, 52a, 52b, 53 are not always required, and in situations where no antenna/diplexer or diplexer/transmitter mismatch is present, no tuning rings would be required. One tuning ring 50 is comprised of metal, such as aluminum, or the like, while the other tuning rings 51, 52a, 52b, 53 are comprised of dielectric material, such as rexolite, or the like.

In addition, the diplexer 10 is adapted to process various types of polarized energy, including circular, linear or elliptical. However, circularly polarized energy is the most difficult to process due to the fact that properly balanced resonator arrangements 15, 30, 40 are required in order to preserve the circular nature of the energy during processing in the diplexer 10.

Figure 2:
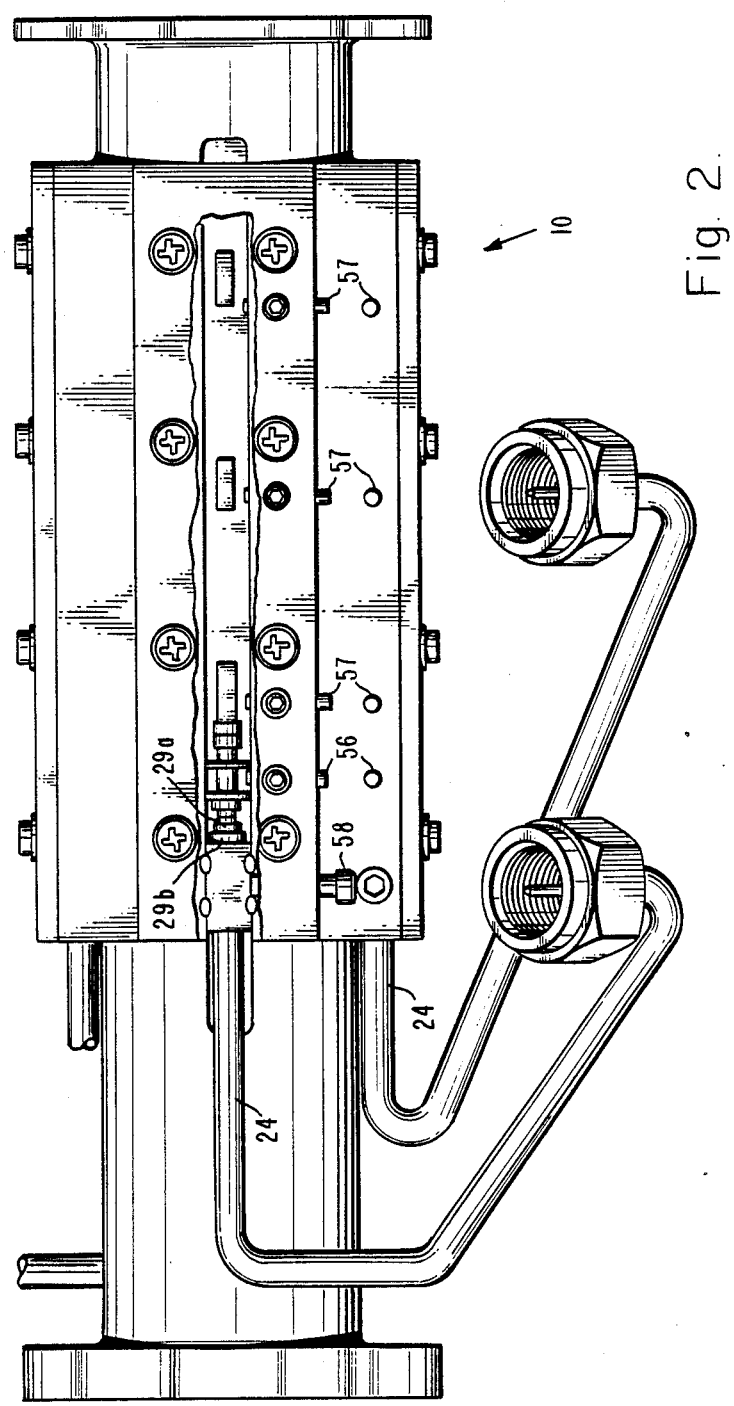
FIG. 2 is a cutaway top view of a diplexer of FIG. 1.

Referring to FIG. 2, a side view of the diplexer 10 is shown, which better illustrates the coaxial transmission lines 24 that are coupled to external hybrid couplers (not shown), for example. The coaxial transmission lines 24 are terminated by a metal disc 29a backed by a dielectric washer 29b. Shown in more detail in FIG. 2 are tuning members 56, 57. The first tuning member 56 is comprised of metal while the second tuning member 57 is comprised of dielectric material, such as alumina, for example. A set screw 58 that secures the bandpass resonator arrangement 15 in place is also shown. The various components comprising the bandpass resonator arrangement 15 are compressed together and the various tuning members are employed to tune the resonant frequency and amount of output coupling provided through the arrangement. This will be discussed in more detail below. Tuning members 57 are also provided for the bandstop resonators 31, 41 of the bandstop resonator arrangements 30, 40.

Figure 3:
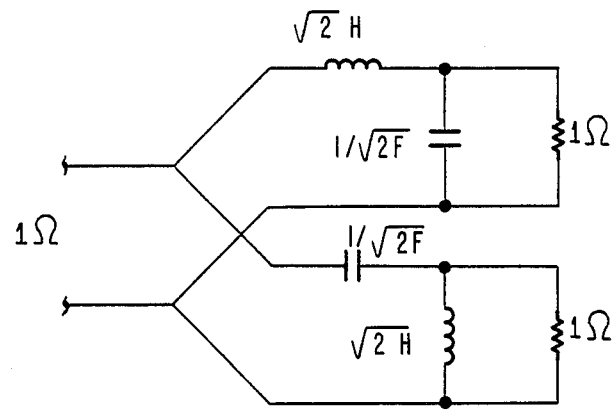
FIG. 3 is an equivalent electrical circuit representative of the diplexer of the present invention.

The diplexer 10 of FIGS. 2 and 3 is optimized for use in processing circularly polarized energy. However, it is to be understood that linearly or elliptically polarized energy may also be processed by the diplexer 10. If linearly polarized energy is employed, then typically only two sets of the resonator arrangements 15, 30, 40 are required. If elliptically polarized energy is processed, then control of the elliptical characteristics of the energy are typically controlled by the external hybrid coupler, for example.

Referring to FIG. 3, an equivalent electrical circuit representative of the diplexer 10 of the present invention is shown. In this equivalent circuit the 1 ohm input at the left represents an antenna port. The resistive load in the upper arm of the circuit represents the coaxial transmission line 24, while the inductance represents the first resonator 20 of the bandpass resonator arrangement 15 and the capacitance represents the second resonator 21 of the bandpass resonator arrangement 15. Similarly, the resistive load in the lower arm represents the transmit port, while the inductance represents a bandstop resonator arrangement 40 and the capacitance represents the other bandstop resonator arrangement 30.

Figure 4:
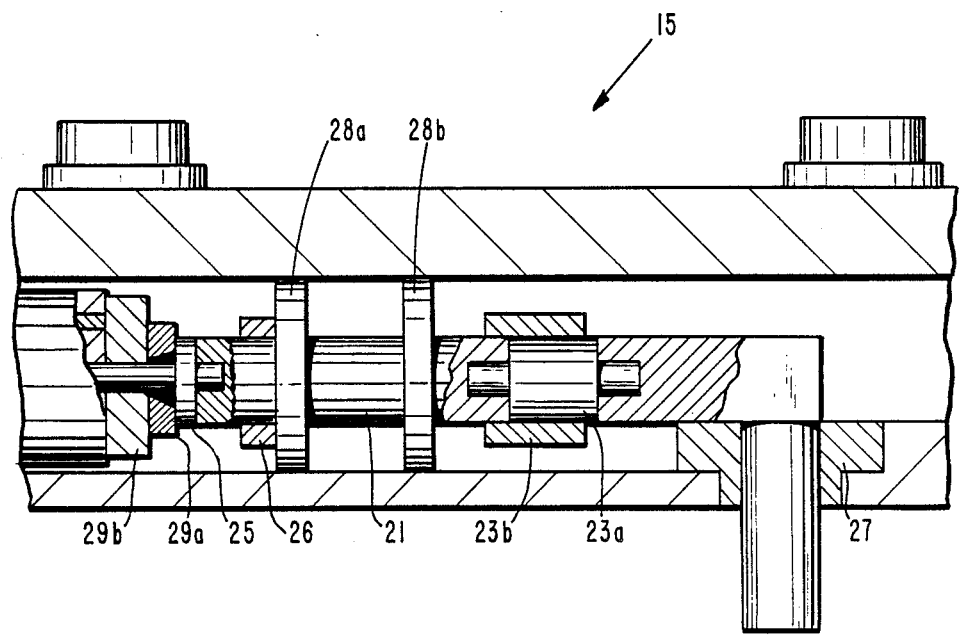
FIG. 4 is an enlarged view of a resonator arrangement of the diplexer of FIG. 1.

With reference to FIG. 4, it shows an enlarged view of one resonator arrangement 15a of the diplexer 10 shown in FIG. 1. This enlarged view shows the details of construction of the resonator arrangement 15a.

In operation, the electrical design of the diplexer 10 is derived from the low pass equivalent circuit of FIG. 3. More particularly, the antenna port is on the left, the receiving port is in the upper right, and the transmitting port is in the lower right. The low pass band is $-1 \leq w \leq 1$ radian per second, and the transmission function is that of a two pole maximally flat characteristic with 3 dB loss at the edges. This is transformed to a center frequency of 17.538 GHz and 3 dB bandwidth of approximately 1.2 GHz. The transmit frequency band is 11.7 GHz to 12.105 GHz. The waveguide diameter is 0.690 inches for which the $TM_{01}$ cutoff frequency is 13.05 GHz. The $TM_{21}$ cutoff frequency is 16.58 GHz. The diplexer is optimally designed for use with energy having circular polarization for both received and transmitted signals. The waveguide is overmoded at the receiving band, and couplings between the antenna port and the receive port for the $TM_{01}$ and $TE_{21}$ modes should be avoided. To meet these requirements, the resonators 20, 21, 31, 41 of each resonator arrangement 15, 30, 40 are spaced at 90 degree intervals around the waveguide 12. The received output from these resonator arrangements 15 are combined in an external set of power summing hybrides. Circularly polarized $TE_{11}$ waves are not depolarized, and $TM_{01}$ and $TE_{21}$ waves are not scattered by the resonator arrangements 15 because of their symmetry.

The specific construction details of the diplexer 10 is as follows. The waveguide 12 is a 0.690 inch diameter barrel surrounded by four machined 0.130 square channels with covers that house the bandpass filter resonator arrangements 15, and bandstop filter resonator arrangements 30, 40. The coaxial output transmission lines 24 deliver the received power from the four bandpass resonator arrangements 15 to the external combining hybrid network. The first bandpass resonator 20 is coupled to the waveguide 12 by protruding into it. It is a TEM type resonator approximately a half wave long. It is capacitively coupled to the second bandpass resonator 21 by the dielectric spacer 23a and sliding dielectric collar 23b. The first bandpass resonator 20 and rejection resonators 31, 41 are held by the dielectric ring supports 27. The second bandpass resonators 21 are also half wavelength TEM resonators, and are capacitively coupled to the coaxial line 24 by the second dielectric spacer 25 and sliding dielectric collar 26. The coaxial lines 24 are terminated by a metal disc 29a backed by a dielectric washer 29b. The second resonators 24 are supported by the dielectric rings 28a, 28b which are cemented to the resonator 21 and the wall of the waveguide 12.

The first and second bandstop resonators 31, 41 and dielectric ring supports 27 are cemented together and to the waveguide 12. The resonators 20, 31, 41 are spaced three quarters of a guide wavelength at 17.5 GHz. Tuning adjustments for the bandpass resonators 20 are provided by alumina rods 57 which add a small capacity to the ends of the resonators 20. The metal rod 56 lowers the inductance of the second bandpass resonator 21 to trim its resonant frequency.

The tuning rings 50, 51, 52a, 52b in the waveguide 12 tune out mismatch of the feed horn at both 12 GHz and 17 GHz. The metal ring 50 and dielectric ring 51 combination tunes out 17 GHz mismatches, and the dielectric rings 52a, 52b tune out combined horn and ring mismatches at 12 GHz without effect at 17 GHz because of their spacing. The dielectric ring 53 at the second port 13 tunes out the reflections from the resonator arrangements 15, 30, 40 caused by the resonators at 12 GHz.

During test, the diplexer 10 was connected to a feed horn and hybrid summing network, and the axial ratio measured 0.35 dB maximum over the receiving band of 17.358 to 17.738 GHz. With the horn attached to the diplexer 10, the return loss at the receiving port of the summing network was 27 dB minimum in the receiving band. The return loss at the transmitting port with the horn attached was 17 dB minimum in the transmitting band of 11.7 to 12.105 GHz. Isolated between the antenna port and transmit port at the receive band was 17 dB.

Thus there has been disclosed a new and improved diplexer that permits the simultaneously processing of polarized energy at different transmit and receive frequencies while maintaining the polarization characteristics of the energy and which provides for the use of a single antenna feedhorn at both transmit and receive frequencies. The diplexer may be employed with any type of polarization, including circular, linear, or elliptical, but is optimized for use with circular polarized energy.

It is to be understood that the above-described embodiment is merely illustrative of some of the many specific embodiments which represent applications of the principles of the present invention. Clearly, numerous and other arrangements can be readily devised by those skilled in the art without departing from the scope of the invention. For example, if linearly polarized energy is employed, then typically only two sets of the resonator arrangements are required. If elliptically polarized energy is processed, then control of the elliptical characteristics of the energy are typically controlled by the external hybrid coupler, for example.

What is claimed is:

1. A diplexer for processing circularly polarized energy at separate transmit and receive frequencies, the diplexer comprising:
    a waveguide having first and second ports disposed at opposite ends thereof;
    a plurality of bandpass resonator arrangements disposed symmetrically about the periphery of said waveguide, each of said bandpass resonator arrangements including:
    a first bandpass resonator protruding a predetermined length into said waveguide;
    a second bandpass resonator disposed outside of said waveguide;
    means for capacitively coupling said first bandpass resonator and said second bandpass resonator; and,
    tuning means for tuning the resonant frequency of said first and second bandpass resonators to said receive frequency;
    a plurality of coaxial transmission lines corresponding to said plurality of bandpass resonator arrangements;
    means operatively associated with each one of said plurality of bandpass resonator arrangements for capacitively coupling said second bandpass resonator of each said bandpass resonator arrangement to its said corresponding coaxial transmission line;
    a plurality of first bandstop resonator disposed symmetrically about the periphery of said waveguide between said second port of said waveguide and said plurality of bandpass resonator arrangements, each of said first bandstop resonators protruding a predetermined length into said waveguide and adapted to reject energy at said receive frequency to prevent transmission thereof through said second port of said waveguide; and,
    wherein said tuning means and said capacitively coupling means cooperatively function to control the amount of energy at said receive frequency coupled out of said waveguide by said pluarlity of bandpass resonator arrangements, and to balance the polarization of said receive frequency energy coupled out of said waveguide by respective ones of said plurality of bandpass resonator arrangements to thereby maintain the polarization state thereof.

2. The diplexer as set forth in claim 1, wherein said tuning means of each one of said plurality of bandpass resonator arrangements includes:
    a first tuning member for adjusting the capacitance of said first bandpass resonator; and,
    a second tuning member for adjusting the inductance of said second bandpass resonator.

3. The diplexer as set forth in claim 2, wherein said first tuning member of each one of said plurality of bandpass resonator arrangements comprises a dielectric rod which functions to add a small capacity to an end of said first bandpass resonator.

4. The diplexer as set forth in claim 3, wherein said second tuning member of each one of said plurality of bandpass resonator arrangements comprises a metal rod which functions to lower the inductance of said second bandpass resonator.

5. The diplexer as set forth in claim 1, wherein said first bandpass resonators of said plurality of bandpass resonator arrangements are evenly spaced at 90 degree intervals around the periphery of said waveguide in a common plane which is disposed perpendicular to the longitudinal axis of said waveguide.

6. The diplexer as set forth in claim 1, wherein said first and second bandpass resonators of each one of said plurality of bandpass resonator arrangements are TEM-type resonators.

7. The diplexer as set forth in claim 1, further comprising a plurality of second bandstop resonators disposed symmetrically about the periphery of said waveguide between said plurality of first bandstop resonators and said plurality of bandpass resonator arrangements, each of said second bandstop resonators protruding a predetermined length into said waveguide and adapted to reject energy at said receive frequency to prevent transmission thereof through said second port of said waveguide.

8. The diplexer as set forth in claim 7, further comprising tuning ring means disposed adjacent to said first port of said waveguide for compensating for impedance mismatch caused by external components coupled to said waveguide.

* * * * *